United States Patent [19]
Le Mouel

[11] 3,944,939
[45] Mar. 16, 1976

[54] DEMODULATOR ASSEMBLY FOR TRAINS WITH DIFFERENTIAL PHASE MODULATION

[75] Inventor: Bernard Le Mouel, La Roche Derrien, France

[73] Assignee: Societe Lannionnaise d'Electronique Sle-Citerel, France

[22] Filed: Apr. 16, 1974

[21] Appl. No.: 461,372

[30] Foreign Application Priority Data
Apr. 16, 1973 France .............................. 73.13730

[52] U.S. Cl. ................ 329/104; 325/320; 328/109; 329/112; 329/137
[51] Int. Cl.² .......................................... H03K 9/04
[58] Field of Search .......... 329/104, 112, 137, 138; 328/109, 110, 133, 140; 325/320; 178/88

[56] References Cited
UNITED STATES PATENTS

| 3,244,986 | 4/1966 | Rumble | 325/320 X |
| 3,501,704 | 3/1970 | Webb | 329/112 |
| 3,614,639 | 10/1971 | Belman | 329/104 |
| 3,654,564 | 4/1972 | Tisi et al. | 329/104 X |
| 3,705,359 | 12/1972 | Kappes | 329/104 |
| 3,803,502 | 4/1974 | Pillot et al. | 329/104 |

Primary Examiner—John Kominski
Attorney, Agent, or Firm—Craig & Antonelli

[57] ABSTRACT

Demodulator assembly for m data trains, with differential phase modulation, comprising, for each train, an elementary demodulator dimensioned over a space of one bit, whereas the coding is effected over a space of n intermediate bits, comprising, for each train, a shift register having $n+1$ flip-flops in a functional connection with an adder.

5 Claims, 3 Drawing Figures

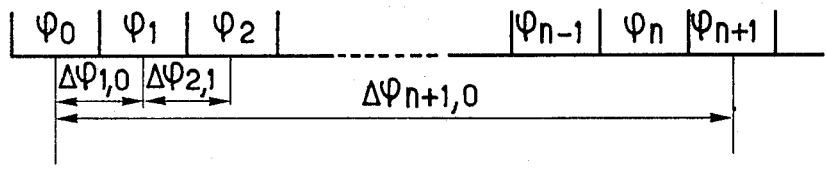
FIG.1
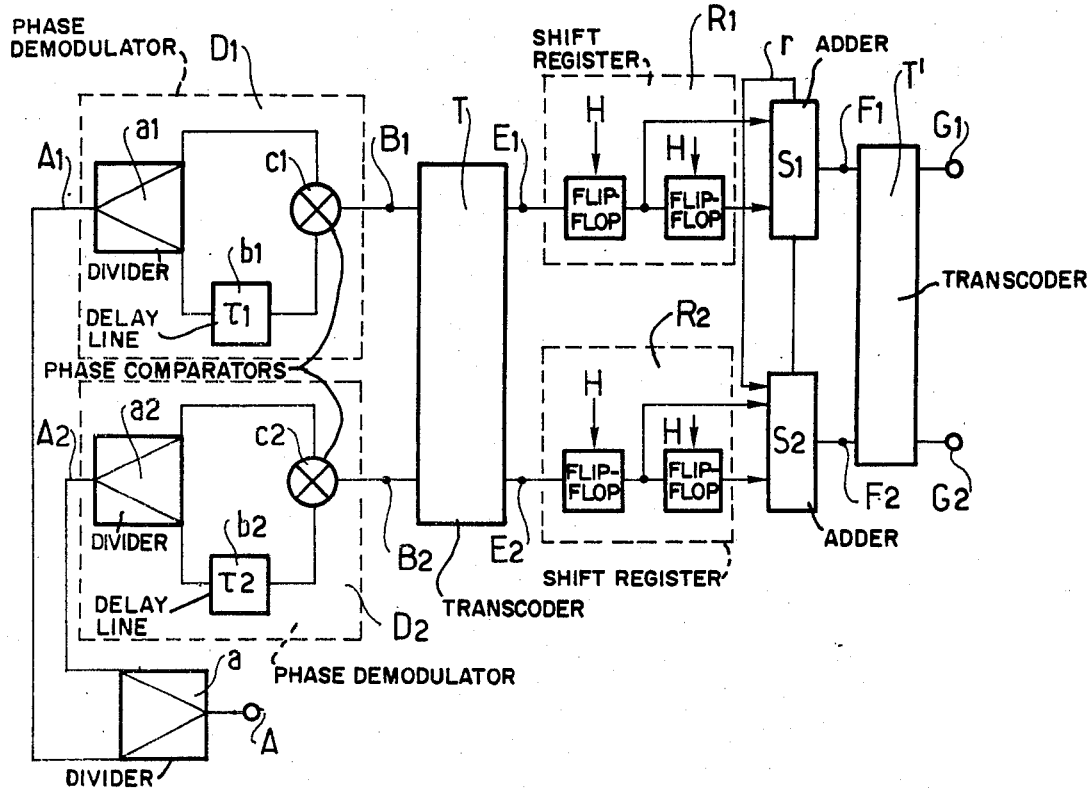
FIG.2
FIG.3
| $\Delta\varphi_{2,0}$ | G | | N | |
|---|---|---|---|---|
| 0 | 0 | 0 | 0 | 0 |
| $\pi/2$ | 1 | 0 | 0 | 1 |
| $\pi$ | 1 | 1 | 1 | 0 |
| $3\pi/2$ | 0 | 1 | 1 | 1 |

DEMODULATOR ASSEMBLY FOR TRAINS WITH DIFFERENTIAL PHASE MODULATION

The invention comes within the branch of demodulators for transmissions by differential phase or phase jump, in which a logic value is transmitted in the form of a phase shift of the carrier between one telegraphic moment and an anterior telegraphic moment; at the receiving, the logic value is reconstituted according to the dephasing of the carrier between a moment received and a moment received previously. The invention concerns more particularly a demodulator assembly for a transmission system comprising m logic trains with a modulation having $2^m$ phase jumps: it provides, in that case, a solution which is more reliable than known solutions, comprising the combining of a simple logic circuit with a simplified unitary demodulator.

Systems for transmission by differential phase of the current type use a coding by dephasing between adjacent bits.

For very high transmission speeds, for example, greater than 200Mb/s, it is a known method to use modulation systems having a differential phase with coding, no longer between adjacent bits, but between bits separated by n clock periods.

According to a conventional diagram, each of the m trains received is applied to a first input of a unitary demodulator, which receives, on a second input, the same train delayed by a delay line. The delay, which is in the order of a clock period for a demodulation by dephasing between adjacent bits, has a value in the order of $(n+1)$ clock periods for a coding between bits separated by n intermediate clock periods.

Now, a delay line is a physical element sensitive to thermal effects: the effective dephasing which it provides varies, therefore, as a function of the temperature and on the other hand, also as a function of the value of the frequency received, which may vary about a rated value. Such a variation in the dephasing, which is all the more marked as the line gives a greater delay, will cause an increase in the rate of errors for a given signal-to-noise ratio.

The invention overcomes that defect by effecting demodulations of the trains received by unitary demodulators equipped in a uniform way with a delay line having a value equal to about only one clock period, the unitary demodulators being combined with a simple logic circuit, which, starting from the valves demodulated between adjacent bits by unitary demodulators, supplies, at the output, the original logic values coded by dephasing between bits separated by n intermediate clock periods.

Such a demodulator assembly, in which all the delay lines have the shortest value possible, will be much less sensitive to the detrimental effects mentioned above.

The combined logic circuit being, as will be shown herebelow, relatively simple and not very expensive, a demodulator assembly which is more reliable than known systems will be obtained for a negligible extra cost.

On the other hand, if the data transmitted comprises m bits in parallel, the transmission will require a modulation having $2^m$ phases, as is known. m may assume any whole value. In practice, m is limited to 4.

It should be noted that the parameters m and n are totally independent: for example, it is possible to effect a data transmission by bits having the same parity ($n = 1$) for a two-phase system ($m = 2$), for a four-phase system or ($m = 3$) for an eight-phase system: the choice of the number n of intermediate bits is imposed only by technological considerations relating to the speed of the circuits.

The demodulator assembly for differential phase modulation according to the invention will be described in detail with reference to the accompanying figures, among which:

FIG. 1 shows a succession of dephasings as a function of time;

FIG. 2 is a diagram of an embodiment of the invention;

FIG. 3 is a table of equivalences between dephasing values and logic values;

FIG. 1 - $n + 1$ moments, comprising n moments having respective phases $\phi$. $\phi 1..., \phi n$, between a reference moment whose phase is $\phi 0$ and a moment in phase correspondence whose phase is $\phi n+1$ are shown in the instants axis.

Between unitary moments, the following phase shifts are obtained:

$$\phi 1 - \phi 0 = \Delta \phi 1, 0$$
$$\phi 2 - \phi 1 = \Delta \phi 2, 1$$
$$\phi n+1 - \phi n = \Delta \phi n+1, n$$

If the sum of the equations is worked out expression by expression, the result obtained is:

$$\phi_{n+1} - \phi_0 = \sum_{i=1}^{i=n+1} \Delta\phi_{i,i-1}$$

It will therefore be seen that, knowing the unitary $\Delta \phi s$, reaching unitary demodulators operating on a delay of a single bit, comprising therefore a delay line whose delay is in the order of one clock instant, the phase jump having n intermediate bits which was used as a basis for the modulation at the emission is deduced therefrom. Applying a predetermined linear relation between the detected phase jump and the logic values, the demodulated value of the m bits is deduced therefrom.

FIG. 2 - FIG. 2 shows a diagram of an example of embodiment in the case $n = 1$ (bits having the same parity) $m = 2$ (two trains, four phases).

The data is transmitted generally in Gray code or reflected code to reduce the proportion of errors when there is noise. Now, the operation symbolized by the equation (1) hereinabove can be effected only in natural binary code. The complete process should comprise a Gray code-natural binary code transcoding before the addition, as well as a reverse transcoding after the addition.

The device comprises the following elements:

The incident signal A containing the data is subdivided by an element a into two signals A1, A2. The signal A1 undergoes an individual phase demodulation, as is known, in a phase demodulator D1, which comprises: an element a1 subdividing the signal A1 into two identical signals; a phase comparator c1 which receives, at one input, a first half of the subdivided signal A1 and, on another input, the other half of the subdivided signal A1, which has passed through a delay line $b1$, having a delay lasting $\tau1$, in the order of a clock instant, giving, for example, a dephasing of the carrier equal to $\pi/4 + (2k + 1).\pi/2$, where $k$ is an integer.

The signal A2 is demodulated by a phase demodulator D2 constituted by elements $a2$, $c2$, identical to the elements $a1$, $c1$, respectively and by a delay line $b2$ having a delay lasting $\tau 2$ giving a dephasing of the carrier equal for example to $-\pi/4 + (2k + 1).\pi/2$.

A logic train B1 is provided at the output of D1 and a logic train B2 is provided at the output of D2.

In general, the pulses thus obtained pass into regenerators, which have not been shown.

These latter two trains are applied to a first transcoder T which effects the reflected code-natural binary code conversion. Two trains E1, E2 leave the transcoder T.

The trains E1, E2 are applied to the inputs of two shift registers having two flip-flops, R1 and R2. The advance lines of these shift registers receive a signal whose rhythm is H, transmitted, moreover.

The outputs of the two flip-flops of R1 are applied to the inputs of an adder S1; the outputs of the two flip-flops of R2 are applied to the inputs of an adder S2. The adders S1 and S2 are interconnected by a carry-over transfer line r.

A train F1 leaves S1 and a train F2 leaves S2. These two trains are applied to a transcoder T', which effects a reverse transcoding to that of the transcoder T, that is, natural binary code-reflected code and the demodulated trains G1, G2 are obtained at the outputs.

FIG. 3 - FIG. 3 contains a table of equivalences between the phase shifts between bits having the same parity ($n = 1$) and the reflected binary code (G) on the one hand and the natural binary code (N) on the other hand.

Let it be assumed that, in a particular case, the successive phases are: $0, \pi, \pi/2$ The phase jump on two bits having the same parity ($\phi 2$) is equal to $+\pi/2$. The signal to be obtained is therefore 1 0 in reflected code, according to FIG. 3.

The unitary demodulators used (having adjacent bits) will receive the elementary phase jumps $\pi$ (between 0 and $\pi$) and $-\pi/2$ (or $3\pi/2$) between $\pi$ and $\pi/2$. They will therefore supply the couples 1 1 and 0 1 (reflected code), if the unitary demodulators have a truth table identical to that in FIG. 3. The reflected code-natural binary code transcoder T will give 1 0 and 1 1. The adder will supply 1 0 + 1 1, that is, 0 1.

The transcoder T' supplies, in reflected code, 1 0, according to the figure hereabove, this corresponding to the expression found hereabove.

It must be understood that this solution given for the values of the parameters $n = 1$, $m = 2$, has been supplied only by way of an example; the invention has a general scope. For example, where $m = 3$, there would be three shift registers and three elementary adders, etc.

If the coding at the emission has been effected in natural binary code, the transcoders T and T' are useless.

What is claimed is:

1. A demodulator assembly for m differential phase shift modulation trains, in which the phase shift information concerns bits spaced by n intermediate bits, said assembly comprising: for each train elementary demodulator means for providing bit signals relating to phase differences of adjacent bits, shift register means for receiving respective outputs of said demodulator means, said shift register means being provided with n+1 flip-flops, and adder means connected to said shift register means to receive at n+1 bit informations contained in said n+1 flip-flops for producing a respective one of m demodulated output trains being dephased between bits spaced by n intermediate bits.

2. A demodulator assembly as defined in claim 1 wherein a reflected code-natural binary code transcoder means is connected between all of said elementary demodulator means and all of said shift register means.

3. A demodulator assembly as defined in claim 2 wherein a natural binary code-reflected code transcoder means is connected to the outputs of all of said adder means.

4. A demodulator assembly as defined in claim 3 wherein each elementary demodulator means includes means for subdividing the modulation train into a plurality of identical signals, a delay line connected to receive at least one of said signals, and comparator means for comparing the phases of said signals including the delayed signal.

5. A demodulator assembly as defined in claim 4 wherein said adder means are interconnected by a carry-over transfer line.

* * * * *